March 6, 1934.    F. H OWENS    1,950,090
SOUND REPRODUCING APPARATUS
Original Filed April 16, 1929    2 Sheets-Sheet 1

INVENTOR.
FREEMAN H. OWENS.
BY Philip S. Hopkins
ATTORNEYS.

March 6, 1934. F. H. OWENS 1,950,090
SOUND REPRODUCING APPARATUS
Original Filed April 16, 1929 2 Sheets-Sheet 2

INVENTOR.
FREEMAN H. OWENS
BY Philip S. Hopkins
ATTORNEYS.

Patented Mar. 6, 1934

1,950,090

UNITED STATES PATENT OFFICE 1,950,090

SOUND REPRODUCING APPARATUS

Freeman H. Owens, New York, N. Y.

Application April 16, 1929, Serial No. 355,514
Renewed June 29, 1933

7 Claims. (Cl. 179—100.3)

My invention relates to a sound reproducing apparatus and particularly to that type adapted for reproducing photographic sound records and has for its primary object a provision of means for reproducing a plurality of sound records on a single strip of film one after the other automatically.

Another object lies in the provision of certain circuit controlling means whereby the automatic operation of a selector device is controlled to successively permit the reproduction of such plurality of sound records.

In the art of reproducing photographic sound records, it may be desirable to provide a plurality of such records on a single strip of film and reproduce the same one after the other automatically, said sound records being either independent of each other insofar as subject is concerned, or one following the other to provide a continuous selection or program. I have by my invention provided means whereby the successive reproduction of such records is permitted and automatically controlled.

Other objects and advantages in details of construction and operation will be apparent as the description proceeds, reference now being had to the figures of the accompanying drawings forming a part of this application and wherein like reference numerals indicate like parts.

In the drawings:—

Figure 1:
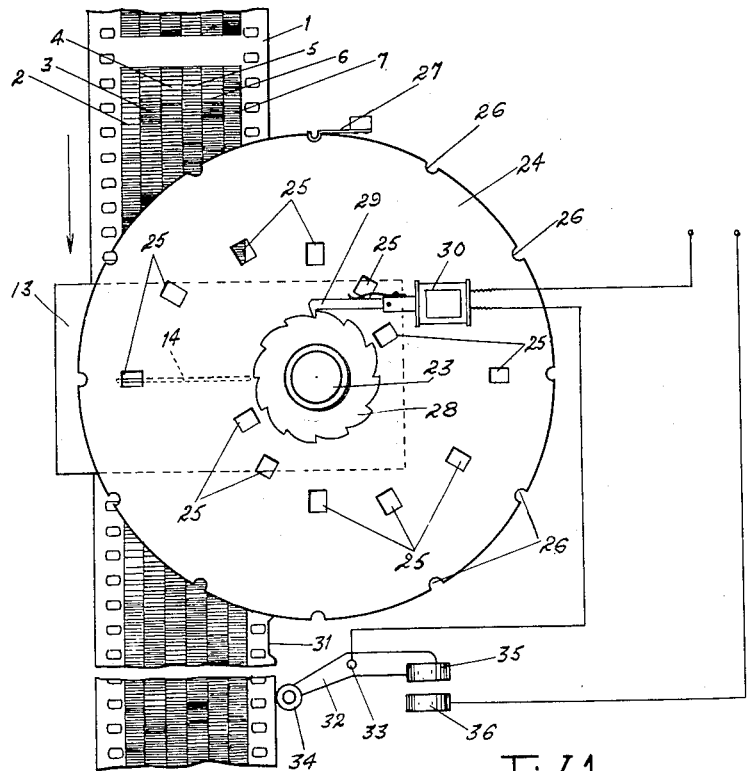
Figure 1 is a detail diagrammatic illustration of my invention.
Figure 2:
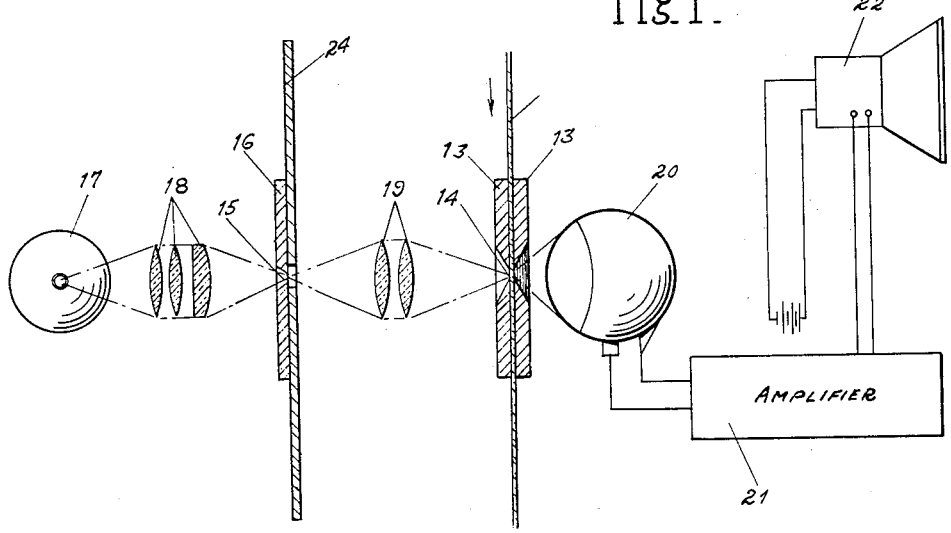
Figure 2 is a detail diagrammatic view showing the sound reproducing mechanism used in connection with my invention.

The reference character 1 refers to a strip of motion picture film provided with a plurality of photographic sound records recorded or printed thereon and indicated at 2, 3, 4, 5, 6 and 7. Although I have shown 6 such records on the drawings, it will be understood that my invention is not limited to that particular number, as there may be more or less records or sound tracks as desired.

The film strip 1 may be moved in any suitable manner through a film gate 13 provided with a slit opening 14 of a length substantially equal to the width of the sound records on the film. A very narrow slit 15 is provided for instance in a plate 16 spaced from the film gate 13 and rays of light from a lamp 17 passing through condenser lenses 18 serve to illuminate said slit 15, the illuminated areal image of which is focused by means of the lenses 19 upon the film 1 where it passes the slit opening 14 in the film gate. A photo electric cell 20 is provided to receive the modulated light rays passing through the gate 13 and such cell is suitably connected to an amplifier 21 and loud speaker device 22. The slit 15 in the plate 16 is also of a length equal to the width of all the sound records on the film 1.

Suitably mounted upon a shaft 23 closely adjacent the slit plate 16, is a selector disk 24 interposed between the slit 15 and the film gate 13. The selector disk 24 is provided with openings 25 so arranged around the disk that they may be upon rotation of the disk successively brought into registry with the slit 15 and at such point in alignment with a particular sound record on the film 1. I have shown 12 of such openings 25 so arranged that rotation of the disk 24 step by step will successively bring one of the openings 25 into alignment with adjacent sound records whereby to successively permit the reproduction of such sound records by the reproducing mechanism just described.

In Figure 1, one of the openings 25 is in registry with the slit 15 and the slit 14 and in alignment with the sound record 2. When such record has been completely reproduced the disk 24 will be rotated one step in a manner to be described, thus moving this first opening 25 out of registry with the slits and bringing the next opening 25 into registry therewith and in alignment with sound record 7. As will be obvious from the drawings, this operation can be repeated indefinitely each movement of the disk bringing the next opening 25 into registry with the slits and in alignment with the next sound record to be reproduced. The selector disk 24 is provided around its periphery with notches 26 equally spaced and equal in number to the number of openings 25. A spring catch 27 is provided at one point adjacent the periphery of the disk and adapted to cooperate with said notches whereby the disk may be frictionally held in each position of registration of the openings 25 and the slits.

Figure 3:
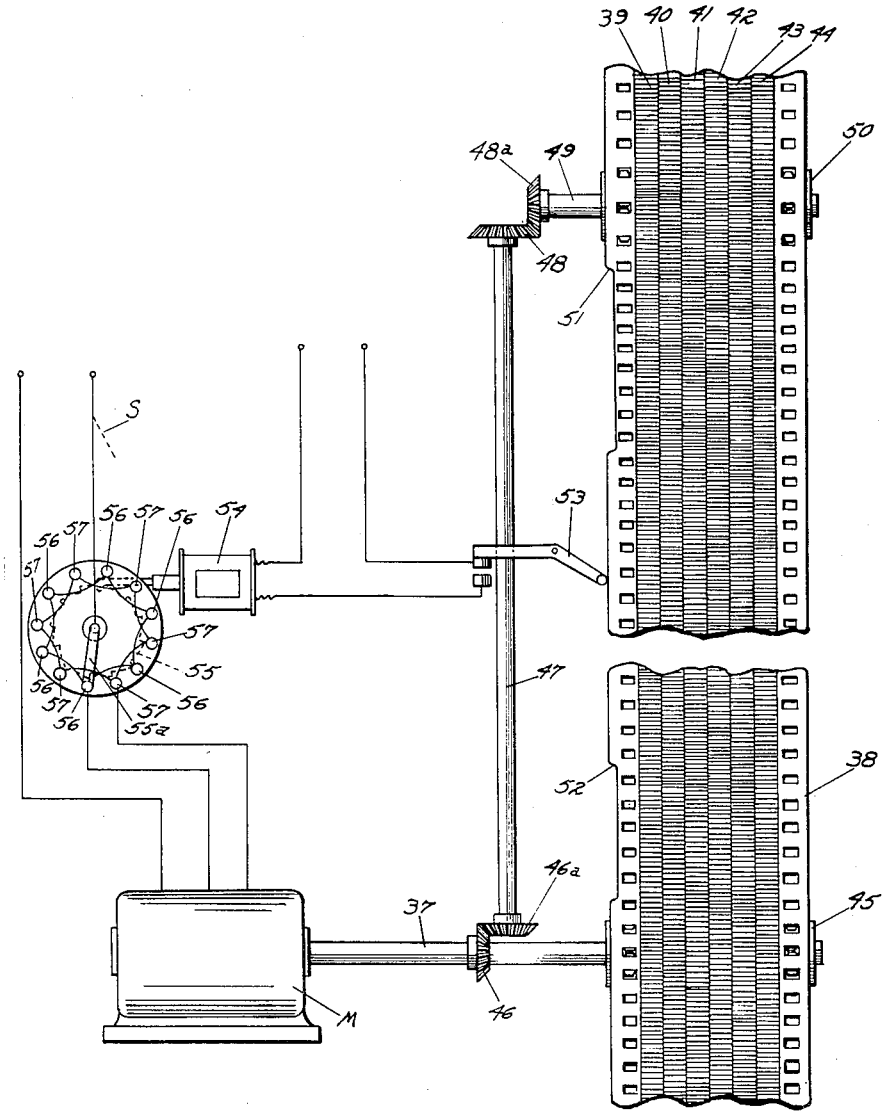
Figure 3 is a diagrammatic view showing a conventional type of film reversing mechanism which may be used with my invention.

It may be stated here that the film 1 with the sound records thereon may be an endless band moving continuously in one direction with respect to the slits as indicated in Fig. 1, or it may be a single length of film movable first in one direction for the length of one sound record and then upon the operation of some suitable reversing mechanism in the opposite direction for the next length of the next sound record, again reversing and so on at the end of each sound record as indicated in Fig. 3. Regardless of whether the film is of the endless type or the single length type, the selector disk is operative to rotate one step upon the completion of each sound record whereby the next sound record may be reproduced through the registered opening 25.

As before stated, means are provided for automatically shifting the selector disk 24 step by step upon the completion of the reproduction of each sound record whereby to register the next opening 25 with the next sound record. Such means will now be described with reference to Fig. 1.

Mounted upon the shaft 23 of the selector disk 24 is a toothed disk 28 provided with the same number of teeth as the number of openings 25. Engageable with the teeth of the disk 28 is a pawl 29 serving as part of the armature of an electro magnet 30 which when energized is adapted to draw the armature inwardly a sufficient distance to rotate the disk 28 and consequently the disk 24 a sufficient distance to bring the next opening 25 into registry with the slits and in alignment with the next sound record.

The energizing of this magnet 30 is controlled by the film itself through the medium of a notch 31 located in the edge of the film at a proper position with respect to the end of the sound records whereby when the end of each sound record has been reached, the notch will operate certain contact device to energize the magnet 30. This contact device consists of a lever 32 pivoted at 33 and provided at one end with a roller 34 engageable with and riding upon the edge of the film 1. The opposite end of the lever 32 is provided with a contact 35 adapted to engage with a stationary contact 36 when the lever is rocked on its pivot due to the roller 34 riding into the notch 31.

Thus, when the end of any one of the sound records has been reached, the roller 34 will ride into the notch 31 in the edge of the film, closing the contacts 35 and 36 and thus energizing the magnet 30 to rotate the selector disk 34.

If the film is of a single length character instead of in an endless loop form, and therefore adapted to be moved first in one direction and then in the other, some suitable film reversing mechanism is provided such as shown in Figure 3.

The motor M, of any known reversible type, serves, through its shaft 37, as a source of driving power for the film 38 bearing the sound records 39, 40, 41, 42, 43, and 44. A sprocket 45 on said shaft is adapted to pull the film downwardly in the usual manner past the gate 13 (see Figure 1). The shaft 37 is provided with a gear 46 meshing with a gear 46a on shaft 47, the opposite end of which has a gear 48 meshing with a gear 48a on a shaft 49 which carries a sprocket 50 engaging the film above said gate 13. Therefore, the sprocket 50 serves to pull the film upwardly past said gate with the motor running in one direction and feed it to said gate when the motor runs in the opposite direction.

Adjacent each end of the film 38 and properly located with respect to the ends of the sound records thereon, there are provided notches 51 and 52 in the edge of the film. Cooperating with the edge of the film and with these notches is a contact maker and breaker 53 similar to the member 32.

When either end of the film is reached in the reproduction of a sound record, this member 53 cooperates with the adjacent notch to close the circuit to a solenoid 54, the armature of which rotates a toothed wheel 55 carrying a contact finger 55a which, upon rotation moves from engagement with one fixed contact of a series 56 to the next fixed contact of a series 57. The contacts of these series are alternated and when the circuit is closed through one series the motor shaft rotates in one direction and when closed through the other series the shaft rotates in the opposite direction. Thus as each end of the film is reached, direction of movement thereof is automatically reversed so long as the main switch S in the main circuit line is closed.

The details of this reversing mechanism have not been dwelt upon as any other conventional type of reversing device could be substituted without affecting this invention.

It will be understood of course, that the notches 51 and 52 are elongated sufficiently to accommodate the over-run of the film at each end when the reversal takes place.

It will thus be seen that I have provided a means for automatically controlling the selective reproduction of a plurality of sound records on a single strip of film, permitting the reproduction of such records continuously one after the other as long as the film is moved past the reproducing station.

Of course, many changes may be made in details of construction and arrangement of parts without departing from the spirit and scope of my invention. I do not limit myself, therefore, to the exact form herein shown and described other than by the appended claims.

I claim:

1. In combination, with a sound reproducing apparatus including a light and an elongated slit past which a film bearing a plurality of sound records is movable, a movable member provided with a plurality of openings, interposed between said slit and film, and means controlled by said film for moving said member to successively register said openings with said slit in alignment with one of said records.

2. In combination with a sound reproducing apparatus including a light and an elongated slit past which a film bearing a plurality of sound records is movable, a movable member provided with a plurality of openings, interposed between said slit and film, and means controlled by said film for moving said member to successively register said openings with said slit in alignment with one of said records, said registry and alignment being successive with respect to said sound records.

3. In acoustic apparatus, the combination of a film having a plurality of reversely arranged sound tracks, a source of light and a photo-electric element arranged on opposite sides of said film in operative relation thereto, mechanism for driving said film forwardly and reversely, an intermittently rotatable shutter disk for exposing only one track at a time to light rays from said source, and means controlled by the film for operating said shutter.

4. In combination with a sound reproducing apparatus including a light and an elongated slit, a rotatable disk provided with a plurality of openings adapted for registry one at a time with said slit as said disk is rotated, each of said openings, when in registry with said slit, being in alignment with one only of a plurality of longitudinal photographic sound records movable with respect to said slit and light, said alignment being with a different record each time said disk is rotated, said slit being of a length equal to the combined width of said sound records.

5. In combination with a sound reproducing apparatus including a light and an elongated slit past which a film bearing a plurality of photographic sound records is movable, a rotatable disk interposed between said slit and said film and provided with a plurality of openings so arranged that rotation of said disk brings said openings successively into registry with said slit and alignment with one of said sound records, and means frictionally holding said disk in its adjusted positions of registry of said openings and said slit, said slit being of a length equal to the combined width of said sound records.

6. In combination with a sound reproducing apparatus including a lamp, a movable film having a plurality of photographic sound records thereon adapted to receive light from said lamp, a photographic sound record translating device in alignment with said lamp and film, and a rotatable shutter disk provided with a plurality of openings, disposed between said lamp and said device, said disk being rotatable independent of the movement of the film to selectively register and align one only of said openings with said lamp, one only of said sound records and said device, said slit being of a length equal to the combined width of said sound records.

7. In combination with a sound reproducing apparatus including a light and a gate having an elongated slit, a rotatable disk provided with a plurality of openings disposed about said disk out of radial alignment with each other for registry one at a time with said slit at different positions along its length as said disk is rotated, each of said openings when in registry with said slit being in alignment with one only of a plurality of longitudinal photographic sound records movable with respect to said slit and light, said slit being of a length equal to the combined width of said sound records.

FREEMAN H. OWENS.